Patented Mar. 10, 1953

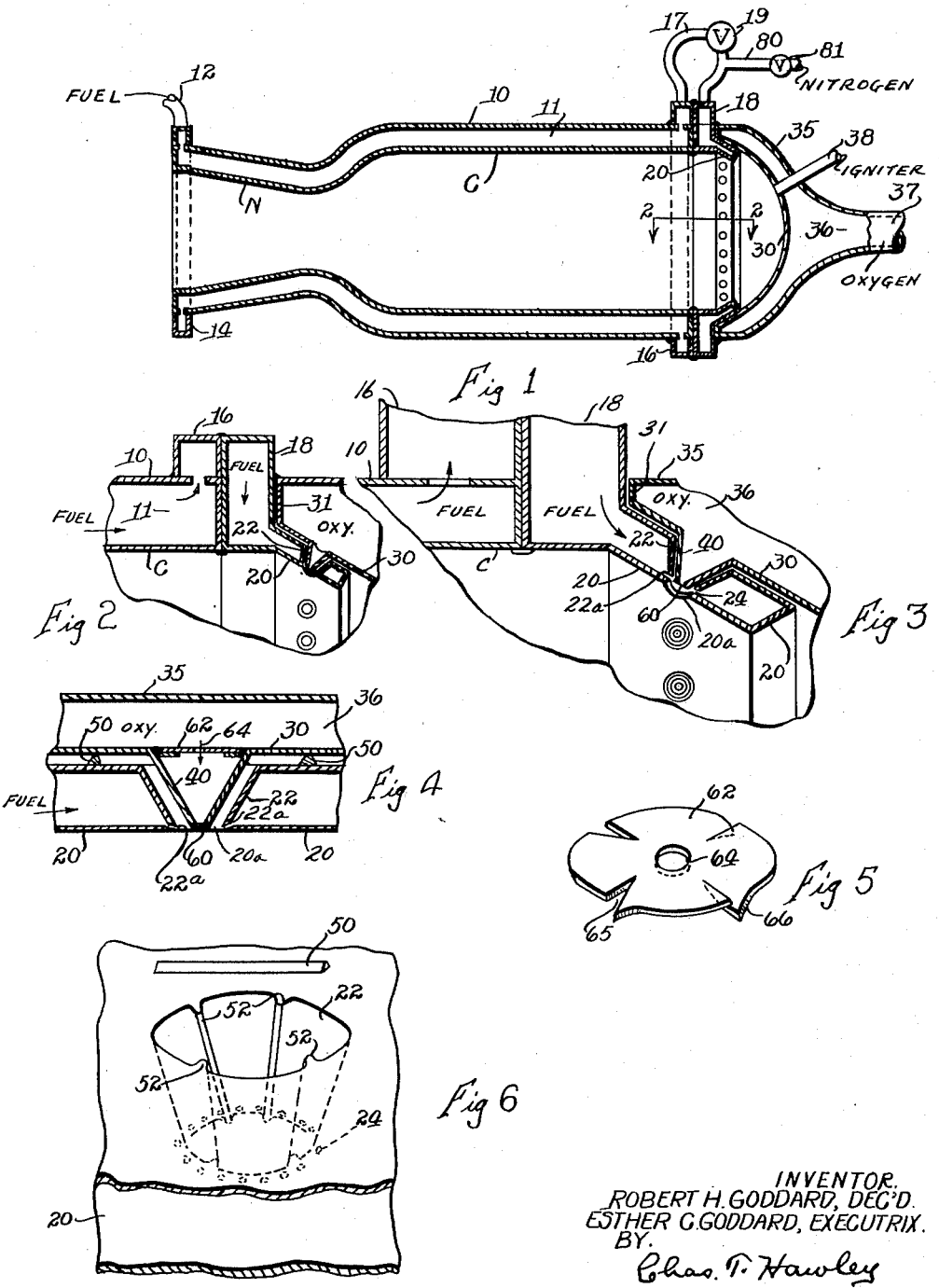

2,630,674

UNITED STATES PATENT OFFICE 2,630,674

DEVICE FOR FEEDING LIQUID COMBUSTION AGENTS TO A COMBUSTION CHAMBER USED IN PROPULSION APPARATUS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application February 1, 1947, Serial No. 725,806

1 Claim. (Cl. 60—39.09)

This invention relates to a combustion chamber adapted for use in jet propulsion apparatus in which two combustion liquids are fed continuously to a combustion chamber in close relationship.

One object of the invention is to provide a construction by which a very cold oxidizing liquid may be used in conjunction with liquid fuel but without freezing the fuel or clogging the fuel feeding devices.

A further object is to provide for effective rinsing of the fuel feeding devices at the end of a run or before starting a new run. The invention also relates to an improved duplex spray device for feeding two different liquids at a single spraying point.

The invention further relates to arrangements and combinations of parts which will be hereinafter described and more particularly pointed out in the appended claim.

A preferred form of the invention is shown in the drawing, in which

Fig. 1 is a sectional side elevation of a combustion chamber embodying this invention;

Fig. 2 is an enlarged partial sectional plan view, taken along the line 2—2 in Fig. 1;

Fig. 3 is an enlarged perspective view, partly in section, of one of the duplex spraying devices;

Fig. 4 is a sectional side elevation of a slightly modified spraying device;

Fig. 5 is a perspective view of a spray plate to be described; and

Fig. 6 is a perspective view of certain parts shown in Fig. 4.

Referring to Fig. 1, a combustion chamber C is provided with a discharge nozzle N and with a casing 10 enclosing a jacket space 11. Liquid fuel is fed under pressure through a pipe 12 to an annular member 14 surrounding the outer end of the nozzle N.

The fuel passes from the annular member 14 to the jacket space 11 and flows along the jacket space in contact with the outer surfaces of the nozzle N and chamber C. The liquid fuel is thus substantially heated, while at the same time the nozzle and combustion chamber walls are effectively cooled.

At the inner or right-hand end of the chamber C (as viewed in Fig. 1), the liquid fuel enters an annular member 16 through which it is delivered to a pipe 17 which connects into a second annular member 18. The pipe 17 is provided with a valve 19.

The second annular member 18 abuts the inner end of the chamber C, as clearly shown in Fig. 2, and has a thin hollow frusto-conical extension 20 provided with conical depressions 22 formed in its upper surface. These depressed portions 22 abut the inner wall of the extension 20, which wall has an opening 20a aligned with each depressed portion. Spray openings 22a are formed around the lower end of each depressed portion 22, as clearly shown in Figs. 3, 4 and 6.

The end wall 30 (Fig. 1) of the combustion chamber overlies the extension 20 and has a portion 31 abutting and secured to the side wall of the annular member 18, as shown in Fig. 2. An outer casing 35 provides a jacket space 36 to which an oxidizing liquid, such as liquid oxygen, is delivered through a supply pipe 37. Any suitable igniter 38 may be provided.

The end wall 30 is provided with conical projections 40 spaced to correspond with the depressions 22 in the volute extension 20. The end wall 30 may be spaced from the extension 20 by ribs 50 (Fig. 4), and each projection 40 may be spaced from the associated depressed portion 22 by inwardly projecting ribs 52 (Fig. 6).

Each projection 40 has a spray opening 60 at its lower end and closely adjacent the spray openings 24 for the liquid fuel. Each depressed portion 22 and associated projection 40 constitute a duplex spraying device.

Preferably, a spray plate 62 (Figs. 4 and 5), overlies each projection 40 and is welded or otherwise secured in the position shown. Each spray plate 62 has a central opening 64 and peripheral notches 65 associated with downwardly displaced edge portions or flanges 66.

When liquid oxygen under pressure is supplied to the jacket space 36, it receives a whirling motion as it is guided by the flanges 66 to pass through the notches 65. Each stream of liquid oxygen injected through a central opening 64 engages the whirling mass of oxygen ejected through the associated notches 65, resulting in the delivery of a solid cone of spray through the feed opening 60. This cone of spray is entirely surrounded by the feed openings 24 through which the liquid fuel is injected, and a very intimate fuel-and-oxidizer mixture is immediately produced.

In order to clear or scavenge the annular member 18 and its extension 20 at the end of a run, a pipe 80 and valve 81 (Fig. 1) is provided. After fuel feed has been shut off by closing the valve 19, the valve 81 is opened and a neutral gas, as nitrogen, is introduced through the pipe 80, thus rinsing the parts 18 and 20 and removing all traces of moisture, which might otherwise freeze and clog the spray openings.

It is also desirable to admit the neutral gas to these parts before starting a new run, so that the first fuel admitted to the chamber C may be somewhat diluted with a neutral gas. A sudden shock or explosion is thus avoided when the fuel first comes in contact with the liquid oxygen.

Having been thus described, the invention is not to be limited to the details herein disclosed, otherwise than as set forth in the claim, but what is claimed is:

Jet propelled apparatus comprising a combustion chamber, a casing surrounding the side wall of said chamber and enclosing a jacket space, means to supply liquid fuel to said jacket space, an annular collecting member at the rear end of said side wall to which said liquid fuel is delivered from said jacket space, a second and distributing annular member adjacent said first annular member and having spray openings to said chamber, a connection between said two annular members, and a shut-off valve in said connection.

ESTHER C. GODDARD,
*Executrix of the last will and testament of Robert H. Goddard, deceased.*

REFERENCES CITED

The following references are of record in the file of this patent:

UNITED STATES PATENTS

| Number | Name | Date |
|---|---|---|
| 871,993 | Goldsborough | Nov. 26, 1907 |
| 1,008,689 | Blaisdell | Nov. 14, 1911 |
| 1,145,389 | Schneider | July 6, 1915 |
| 1,410,389 | Dorsey | Mar. 21, 1922 |
| 2,183,313 | Goddard | Dec. 12, 1939 |
| 2,249,489 | Noack | July 15, 1941 |
| 2,395,113 | Goddard | Feb. 19, 1946 |
| 2,445,856 | Mayer | July 27, 1948 |